(12) United States Patent
Cho et al.

(10) Patent No.: US 6,844,969 B2
(45) Date of Patent: Jan. 18, 2005

(54) FRONT PROJECTION TYPE SCREEN

(75) Inventors: Kun-ho Cho, Gyeonggi-do (KR);
Seung-tae Jung, Gyeonggi-do (KR);
Dae-sik Kim, Gyeonggi-do (KR);
Cheol-sung Yeon, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 10/073,053

(22) Filed: Feb. 12, 2002

(65) Prior Publication Data

US 2002/0126378 A1 Sep. 12, 2002

(30) Foreign Application Priority Data

Mar. 7, 2001 (KR) .......................................... 2001-11732

(51) Int. Cl.$^7$ .............................................. G03B 21/60
(52) U.S. Cl. ....................................................... 359/459
(58) Field of Search ................................ 359/529, 530, 359/443, 449, 452, 454, 455, 459

(56) References Cited

U.S. PATENT DOCUMENTS

| | | | | |
|---|---|---|---|---|
| 1,610,423 A | * | 12/1926 | Cawley | 359/443 |
| 3,893,748 A | * | 7/1975 | De Palma et al. | 359/455 |
| 3,966,301 A | * | 6/1976 | Brown | 359/455 |
| 4,012,115 A | * | 3/1977 | Brown | 359/455 |
| 4,911,529 A | * | 3/1990 | Van De Ven | 359/454 |
| 4,983,016 A | * | 1/1991 | Yamamoto | 359/452 |
| 5,376,431 A | * | 12/1994 | Rowland | 428/164 |
| 5,473,469 A | * | 12/1995 | Magocs et al. | 359/449 |
| 5,903,392 A | * | 5/1999 | Kojima et al. | 359/599 |
| 5,914,825 A | * | 6/1999 | Nishio et al. | 359/459 |
| 5,932,342 A | * | 8/1999 | Zeira et al. | 428/327 |
| 6,091,469 A | * | 7/2000 | Naito | 349/113 |
| 6,144,491 A | * | 11/2000 | Orikasa et al. | 359/452 |

FOREIGN PATENT DOCUMENTS

| | | |
|---|---|---|
| CN | 1165317 A | 7/1996 |
| CN | 1282425 A | 12/1998 |
| CN | 2344791 Y | 9/1999 |
| JP | 5-150368 | 6/1993 |
| JP | 11-38509 | 2/1999 |

* cited by examiner

Primary Examiner—Christopher Mahoney
(74) Attorney, Agent, or Firm—Staas & Halsey LLP

(57) ABSTRACT

A front projection type screen includes a transparent base; a diffusion member formed on one surface of the transparent base; and a retroreflection prism array formed on another surface of the transparent base. Thus, a wide angle of visibility can be secured in a horizontal direction while an angle of visibility in a vertical direction is limited to a narrow scope. Also, a wide viewing angle can be achieved and high efficiency and brightness of light may be obtained.

15 Claims, 6 Drawing Sheets

ANGLE OF VISIBILITY IN
VERTICAL DIRECTION [degree]

FRONT PROJECTION TYPE SCREEN

CROSS-REFERENCE TO RELATED APPLICATIONS

This application claims the benefit of Korean Application No. 2001-11732, filed Mar. 7, 2001, in the Korean Intellectual Property Office, the disclosure of which is incorporated herein by reference.

BACKGROUND OF THE INVENTION

1. Field of the Invention

The present invention relates to a front projection type screen, and more particularly, to a front projection type screen which can realize an image quality with high brightness.

2. Description of the Related Art

In general, a projection display can be divided into a front projection type screen and a rear projection type screen. In the front projection type, an image is projected from a projector onto the front projection type screen and displayed thereon. A size of the front projection type screen is much greater than the rear projection type screen. In contrast, the rear projection type screen, which is usually adopted in typical projection televisions exhibits, provides superior image quality compared to the front projection type.

The difference in the image quality between the front projection type screen and the rear projection type screen lies in a difference in structure of each screen. The rear projection type screen uses a dark tint screen providing high contrast and enabling high brightness by decreasing an angle of visibility in a vertical direction and increasing an angle of visibility in a horizontal direction.

A white screen 1, shown in FIG. 1, is typically used as the front projection type screen. As shown in FIG. 1, the white screen 1 reflects incident light in all directions in a substantially uniform manner. Thus, a viewing angle increases while brightness of the screen decreases. FIG. 2 is a graph showing a distribution of light quantity in relation to an angle of visibility of light reflected by the front projection type screen of FIG. 1.

FIG. 3 shows a conventional front projection type screen in which glass beads 7 are distributed on a screen base 5. Referring to the drawing, when the glass beads 7 are used, because incident light is reflected at an angle within a limited range, the brightness of the screen is superior to that of the white screen 1 in FIG. 1. However, because the angle of visibility in the horizontal direction is the same as that in the vertical direction, an efficiency of light is lowered, making it difficult to secure a desired brightness. Also, diffused reflection occurs as disturbance light overlaps the light emitted from a projector (not shown), thus lowering contrast.

As can be seen in the above, in the conventional front projection type screen, when an angle of visibility, that is, a viewing angle, increases, brightness is lowered, and when brightness is increased, the angle of visibility decreases.

SUMMARY OF THE INVENTION

Various objects and advantages of the invention will be set forth in part in the description that follows and, in part, will be obvious from the description, or may be learned by practice of the invention.

To solve the above-described problems, it is an object of the present invention to provide a front projection type screen having a wide viewing angle and high brightness.

To achieve the above object, there is provided a front projection type screen including: a transparent base; a diffusion member formed on one surface of the transparent base; and a retroreflection prism array formed on another surface of the transparent base.

The front projection type screen further includes a reflection coating layer on a surface of the retroreflection prism array. A light absorbing member blocks light opposite to front side of the retroreflection prism array.

The retroreflection prism array and the light absorbing member form an air layer therebetween. The diffusion member diffuses light in vertical and horizontal directions, where the diffusion of light in the vertical direction is different from the diffusion of light in the horizontal direction. The diffusion member includes an angle of diffusion of light in the horizontal direction greater than an angle of diffusion of light in the vertical direction.

The present invention further provides a front projection type screen including: a transparent base; a diffusion member formed on one surface of the transparent base; a retroreflection prism array formed on another surface of the transparent base; and a reflection coating layer formed on a surface of the retroreflection prism array maximizing a quantity of light reflected by the screen and proceeding back.

According to another aspect of the present invention, a front projection type screen includes a transparent base; a diffusion member formed on one surface of the transparent base; a retroreflection prism array formed on another surface of the transparent base; and a light absorbing member positioned at a front of the retroreflection prism array to block light.

According to another aspect of the present invention, a front projection type screen includes a transparent base; a diffusion member formed on one surface of the transparent base limiting diffusion of light in a vertical direction while increasing diffusion of the light in a horizontal direction; and a retroreflection prism array formed on another surface of the transparent base making the light after passing the diffusion member, proceed back parallel to incident light securing a wide angle of visibility in a horizontal direction and limiting an angle of visibility in a vertical direction.

These together with other objects and advantages, which will be subsequently apparent, reside in the details of construction and operation as more fully hereinafter described and claimed, reference being had to the accompanying drawings forming a part thereof, wherein like numerals refer to like parts throughout.

BRIEF DESCRIPTION OF THE DRAWINGS

The above object and advantages of the present invention will become more apparent by describing in detail preferred embodiments thereof with reference to the attached drawings in which.

DETAILED DESCRIPTION OF THE PREFERRED EMBODIMENTS

Hereinafter, embodiments of the present invention will be described in detail with reference to the attached drawings.

Figure 1:
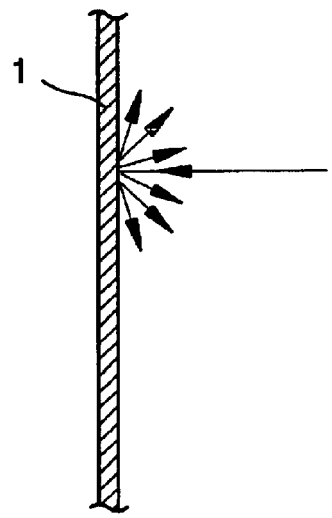
FIG. 1 is view showing an example of a conventional front projection type screen.
Figure 2:
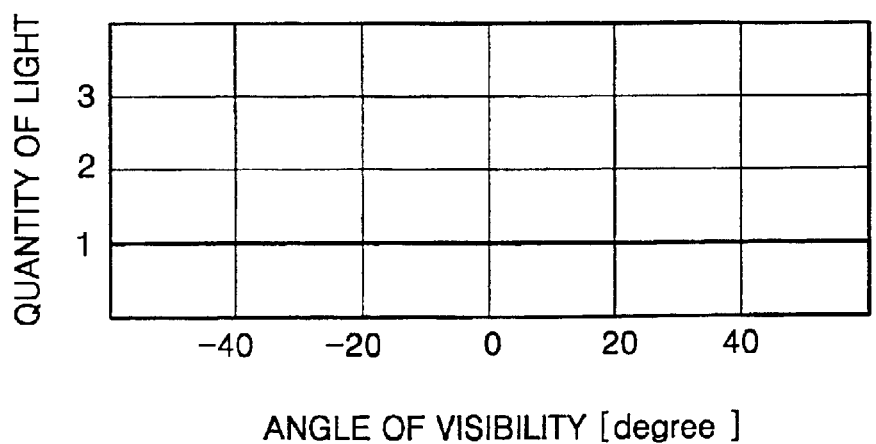
FIG. 2 is a graph showing a distribution of light quantity in relation to an angle of visibility of light reflected by the front projection type screen of FIG. 1.
Figure 3:
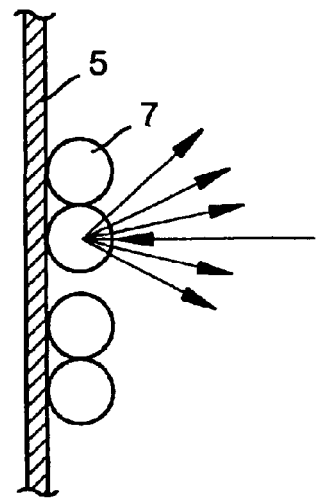
FIG. 3 is a view showing another example of a conventional front projection type screen.
Figure 4:
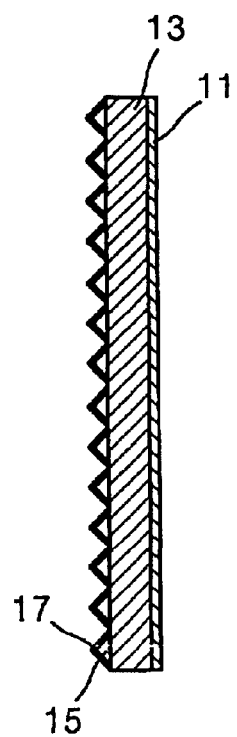
FIG. 4 is a view showing a front projection type screen according to an embodiment of the present invention.

Referring to FIG. 4, a front projection type screen, according to an embodiment of the present invention, includes a transparent base 13, a diffusion member 11 formed at one side of the transparent base 13, a retroreflection prism array 15 formed at another side of the transparent base 13, and a reflection coating layer 17 formed on the surface of the retroreflection prism array 15.

The diffusion member 11 diffuses light in a vertical direction and in a horizontal direction. In an exemplary embodiment, the diffusion member 11 may be formed such that a diffusion angle of light in the vertical direction is limited and the diffusion angle of light in the horizontal direction is not limited. In this case, for exemplary purposes, an angle of visibility in the vertical direction of light proceeding back from the front projection type screen is limited and the angle of visibility in the horizontal direction is increased.

The diffusion member 11, for example, may be formed by extending an opaque diffusion sheet where diffusion factors are uniformly formed. Because the extended diffusion sheet produces diffusion more in a direction perpendicular to an extension direction, the diffusion sheet is attached to the transparent base 13 such that the extension direction is a vertical direction. As a result, the diffusion member 11 may be formed so that an angle of diffusion of light is relatively small in the vertical direction, but relatively large in the horizontal direction.

In another example, a diffusion member where diffusion factors are formed to have an oblong shape may be adopted as the diffusion member 11. Because the rectangular diffusion factors produce diffusion more in a direction along a minor axis, when the diffusion member is attached to the transparent base 13 such that a direction along a major axis is the vertical direction, the diffusion member 11 may be formed where the angle of diffusion of light in the vertical direction is relatively small while the angle of diffusion of light in the horizontal direction is relatively large.

Figure 5:
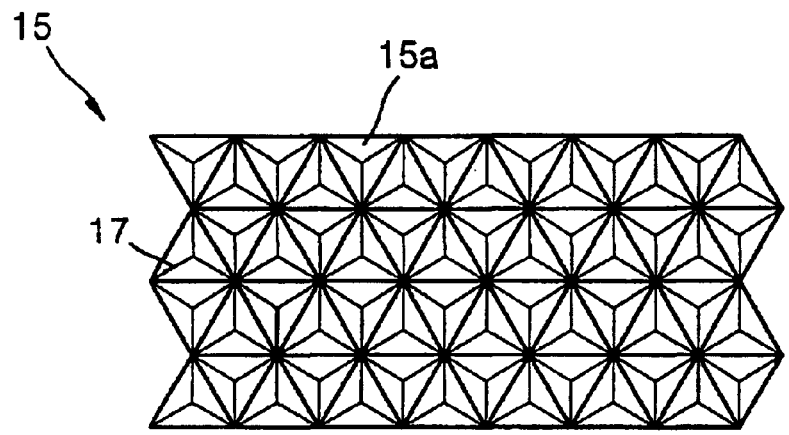
FIG. 5 is an enlarged plan view of a retroreflection prism array in the front projection type screen of FIG. 4.

Referring to FIG. 5, each retroreflection prism 15a of the retroreflection prism array 15, that is, a corner cube prism, has a retroreflection effect by reflecting twice incident light after the light has passed the transparent base 13, and by outputting the light parallel to the incident light. The retroreflection prism array 15 may be formed to have a sheet shape and may be attached to the transparent base 13.

The front projection type screen according to an embodiment of the present invention, may include the reflection coating layer 17 formed on the surface of the retroreflection prism array 15. By providing the reflection coating layer 17, the quantity of light reflected by the screen and proceeding back may be maximized so that light efficiency improves. In the front projection type screen, according to an embodiment of the present invention, because the diffusion member 11 and the retroreflection prism array 15 are manufactured in a form of a sheet, the diffusion member 11 and the retroreflection prism array 15 may be attached to the transparent base 13.

Figure 6:
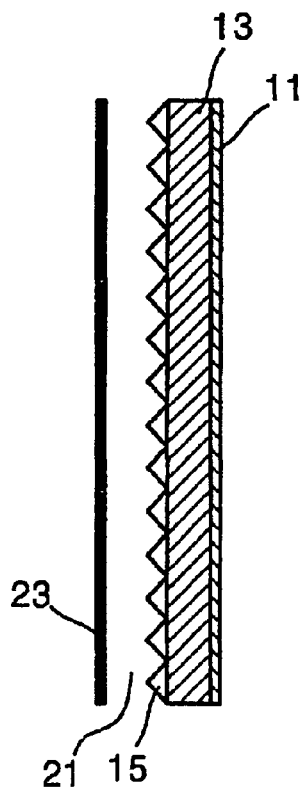
FIG. 6 is a view showing a front projection type screen according to an alternative embodiment of the present invention.
Figure 7:
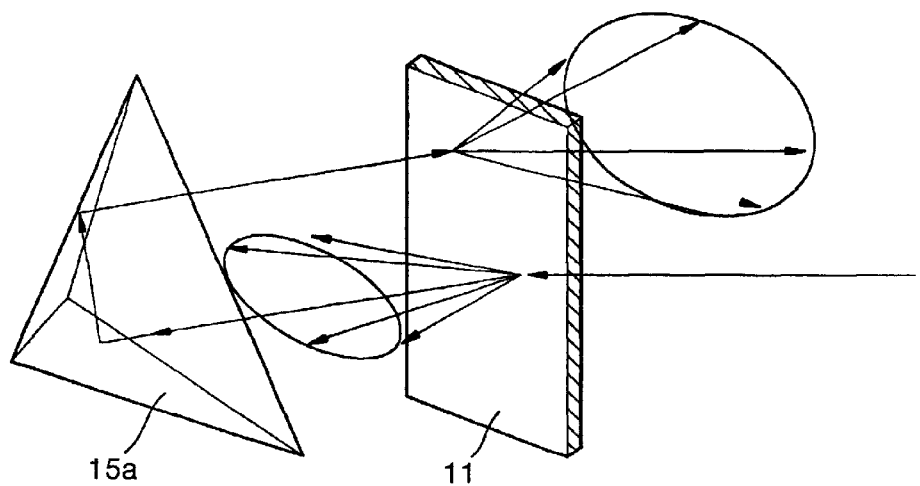
FIG. 7 is a view showing a diffusion and a retroreflection of a light beam by the front projection type screen according to the present invention.

The front projection type screen according to the present invention may be formed without the reflection coating layer 17. As shown in FIG. 6, in a front projection type screen according to another embodiment of the present invention, a light absorbing member 23 to block light is provided opposite to front side of the retroreflection prism array 15 to prevent lowering contrast caused as a background of the screen becomes bright by the light passing the retroreflection prism array 15. Here, an air layer 21 may be provided between the retroreflection prism array 15 and the light absorbing member 23. The air layer 21 allows the light to be totally reflected in the retroreflection prism 15a and proceed back.

When light is irradiated from a projector onto the front projection type screens according to the above embodiments, the light passing through the diffusion member 11 scatters and primarily diffuses. The diffused light is retroreflected by the retroreflection prism 15a and input back to the diffusion member 11. The reentering light scatters again while passing through the diffusion member 11, which in turn diffuses the light and allows the light to proceed.

Figure 8A:
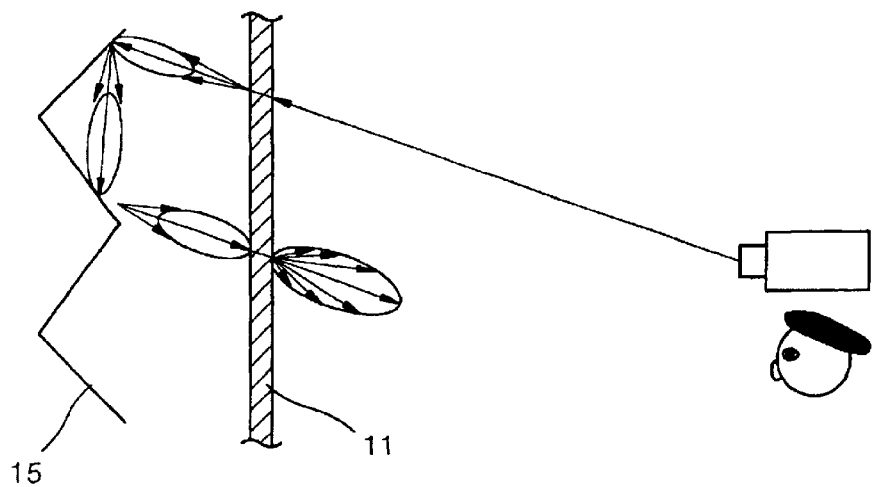
FIG. 8A is a view showing a diffusion of the light beam in a vertical direction by the front projection type screen according to the present invention.
Figure 8B:
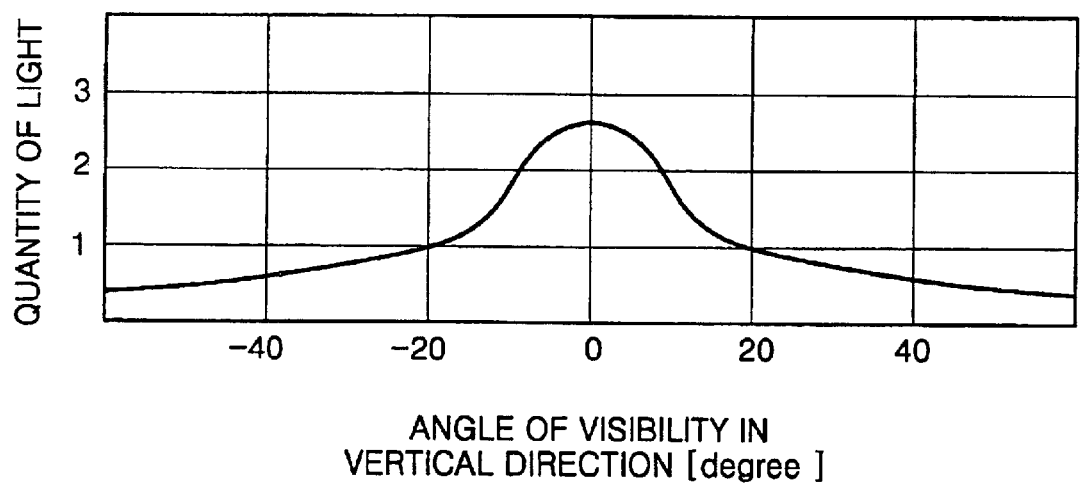
FIG. 8B is a graph showing a distribution of a quantity of light in relation to an angle of visibility in the vertical direction of light reflected by the front projection type screen, according to the present invention, and proceeding back.
Figure 9A:
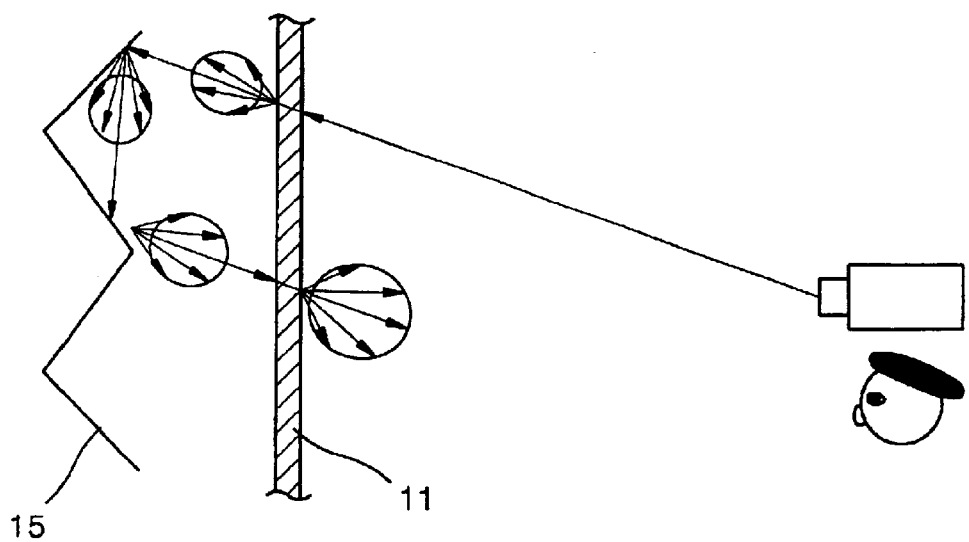
FIG. 9A is a view showing a diffusion of a light beam in a horizontal direction by the front projection type screen according to the present invention.
Figure 9B:
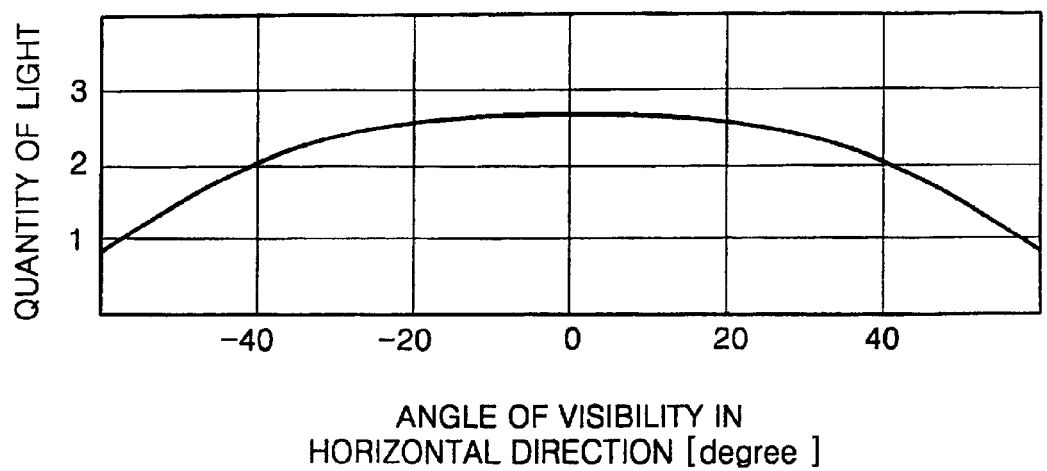
FIG. 9B is a graph showing a distribution of a quantity of light in relation to an angle of visibility in the horizontal direction of light reflected by the front projection type screen, according to the present invention, and proceeding back.

Here, because the diffusion member 11 is formed such that the light beam in the horizontal direction diffuses significantly while the light beam in the vertical direction diffuses limitedly, as can be seen in FIGS. 8A through 9B, a wide angle of visibility is secured in the horizontal direction while the angle of visibility in the vertical direction is limited. FIG. 8A is a view showing the diffusion of the light beam in the vertical direction by the front projection type screen according to the present invention. FIG. 8B is a graph showing the distribution of quantity of light in relation to an angle of visibility in the vertical direction of light reflected by the front projection type screen, according to the present invention, and proceeding back. FIG. 9A is a view showing the diffusion of the light beam in the horizontal direction by the front projection type screen according to the present invention. FIG. 9B is a graph showing the distribution of quantity of light in relation to an angle of visibility in the horizontal direction of light reflected by the front projection type screen according to the present invention, and proceeding back. In FIGS. 8B and 9B, the angle of visibility on the horizontal axis is not an absolute value and the quantity of light on the vertical axis is an arbitrary unit. In the front projection type screens, according to exemplary embodiments of the present invention, the distributions of the quantity of reflected light, according to an angle of visibility, are substantially the same except for a difference in an absolute quantity of light.

Figure 10:
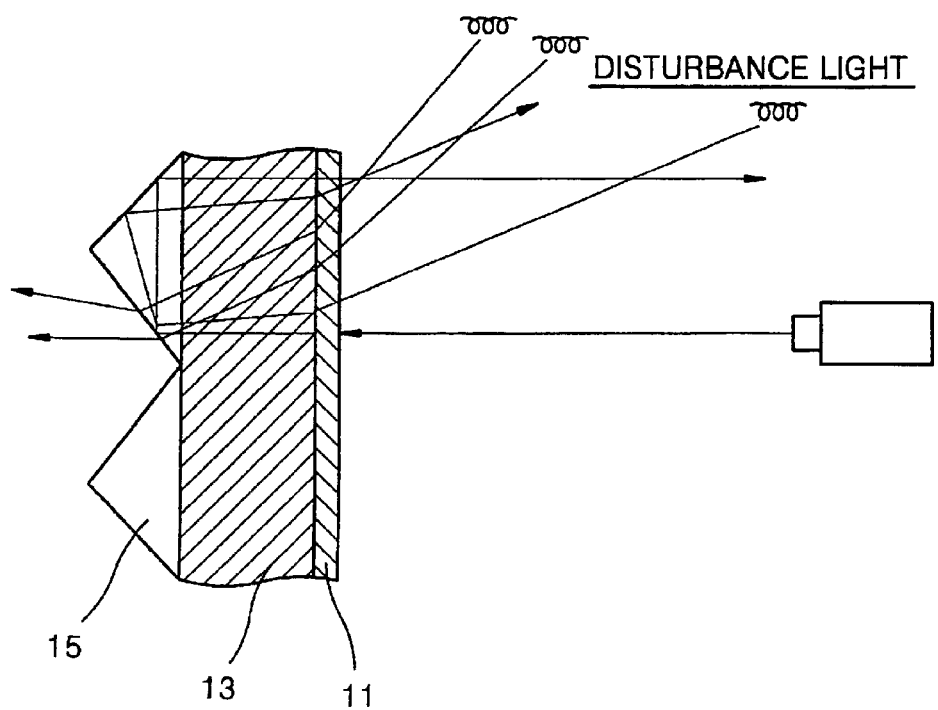
FIG. 10 is a view showing a path of disturbance of light incident on the front projection type screen according to the present invention.

In the front projection type screens, according to exemplary embodiments of the present invention, because the angle of diffusion in the vertical direction is small, as shown in FIG. 10, light from a lamp emitting light as disturbance light is not seen by a viewer so that contrast is greatly improved.

As described above, in the front projection type screen according to the present invention, a wide angle of visibility can be secured in the horizontal direction while an angle of visibility in the vertical direction is limited to a narrow scope because the diffusion member limiting diffusion in the vertical direction while increasing diffusion of light in the horizontal direction, and the retroreflection prism array making the light input after passing the diffusion member proceed back parallel to the incident light are provided. Thus, a wide viewing angle can be achieved and the efficiency of light is high and high brightness can be obtained.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A front projection type screen, comprising:
   a transparent base;
   a diffusion member formed on one surface of the transparent base;
   a retroreflection prism array formed on another surface of the transparent base, wherein the diffusion member comprises a diffusion sheet formed on the one surface of the transparent base; and
   a reflection coating layer on a surface of the retroreflection prism array.

2. The front projection type screen as claimed in claim 1, further comprising a light absorbing member blocking light behind the retroreflection prism array.

3. The front projection type screen as claimed in claim 2, wherein the retroreflection prism array and the light absorbing member form an air layer therebetween.

4. The front projection type screen as claimed in claim 3, wherein the diffusion member diffuses light in vertical and horizontal directions, where the diffusion of light in the vertical direction is different from the diffusion of light in the horizontal direction.

5. The front projection type screen as claimed in claim 4, wherein the diffusion member comprises an angle of diffusion of light in a horizontal direction greater than an angle of diffusion of light in a vertical direction.

6. The front projection type screen as claimed in claim 2, wherein the diffusion member diffuses light in vertical and horizontal directions, where the diffusion of light in the vertical direction is different from the diffusion of light in the horizontal direction.

7. The front projection type screen as claimed in claim 6, wherein the diffusion member comprises an angle of diffusion of light in a horizontal direction greater than an angle of diffusion of light in a vertical direction.

8. The front projection type screen as claimed in claim 1, wherein the diffusion member diffuses light in vertical and horizontal directions, where the diffusion of light in the vertical direction is different from the diffusion of light in the horizontal direction.

9. The front projection type screen as claimed in claim 8, wherein the diffusion member comprises an angle of diffusion of light in a horizontal direction greater than an angle of diffusion of light in a vertical direction.

10. The front projection type screen as claimed in claim 1, wherein the diffusion member diffuses light in vertical and horizontal directions, where the diffusion of light in the vertical direction is different from the diffusion of light in the horizontal direction.

11. The front projection type screen as claimed in claim 10, wherein the diffusion member comprises an angle of diffusion of light in a horizontal direction greater than an angle of diffusion of light in a vertical direction.

12. The front projection type screen as claimed in claim 1, wherein an extension direction of the diffusion sheet is a vertical direction.

13. The front projection type screen as claimed in claim 12, wherein the diffusion member comprises an angle of diffusion of light in a horizontal direction greater than an angle of diffusion of light in the vertical direction.

14. A front projection type screen comprising:
    a transparent base;
    a diffusion member formed on one surface of the transparent base;
    a retroreflection prism array formed on another surface of the transparent base; and
    a reflection coating layer formed on a surface of the retroreflection prism array maximizing a quantity of light reflected by the screen and proceeding back.

15. A front projection type screen comprising:
    a transparent base;
    a diffusion member formed on one surface of the transparent base limiting diffusion of light in a vertical direction while increasing diffusion of the light in a horizontal direction;
    a retroreflection prism array formed on another surface of the transparent base making the light, after passing the diffusion member, proceed back parallel to incident light, securing a wide angle of visibility in a horizontal direction and limiting an angle of visibility in a vertical direction; and
    a reflection coating layer on a surface of the retroreflection prism array.

* * * * *